United States Patent [19]

Chiames

[11] 4,021,128
[45] May 3, 1977

[54] JOINT STRUCTURE FOR MODULAR SHELF ASSEMBLY

[75] Inventor: George J. Chiames, Arlington Heights, Ill.

[73] Assignee: Newell Companies, Inc., Freeport, Ill.

[22] Filed: Nov. 3, 1975

[21] Appl. No.: 627,847

[52] U.S. Cl. ............................. 403/217; 403/219; 403/257; 108/64; 108/101; 108/111
[51] Int. Cl.² .................................... A47B 96/00
[58] Field of Search ............ 108/64, 101, 111, 114, 108/158; 403/217, 219, 230, 247, 257, 263, 314

[56] References Cited

UNITED STATES PATENTS

| | | | |
|---|---|---|---|
| 1,431,823 | 10/1922 | Leconte | 108/114 |
| 3,636,893 | 1/1972 | Lange et al. | 108/101 X |
| 3,831,533 | 8/1974 | Kellogg | 108/64 |

FOREIGN PATENTS OR APPLICATIONS 459,215  8/1949  Canada

Primary Examiner—James C. Mitchell
Attorney, Agent, or Firm—Leydig, Voit, Osann, Mayer & Holt, Ltd.

[57] ABSTRACT

A joint structure for connecting together shelves in a modular shelf assembly includes first and second, coplanar, abutting shelves. A hole is formed through the shelves with one-half of the hole being formed in each shelf so as to complete the hole when the shelves are abutting each other. The shelves are sandwiched between first and second vertically extending supports which are connected together by fastening means extending through the hole in the shelves. Formed in the upper side of the shelves is an annular recess concentric with the hole and having an inverted cup-shaped bottom surface. An annular boss is formed on the end of the upper support and includes a cup-shaped end surface sized to fit within the recess. When the fastening means is tightened between the supports, the boss telescopes into the recess with the end surface seating against the bottom surface of the recess, camming the shelves together in abutting edgewise engagement and holding the shelves against edgewise separation without the end surface of the upper support engaging the upper surface of the shelves.

4 Claims, 5 Drawing Figures

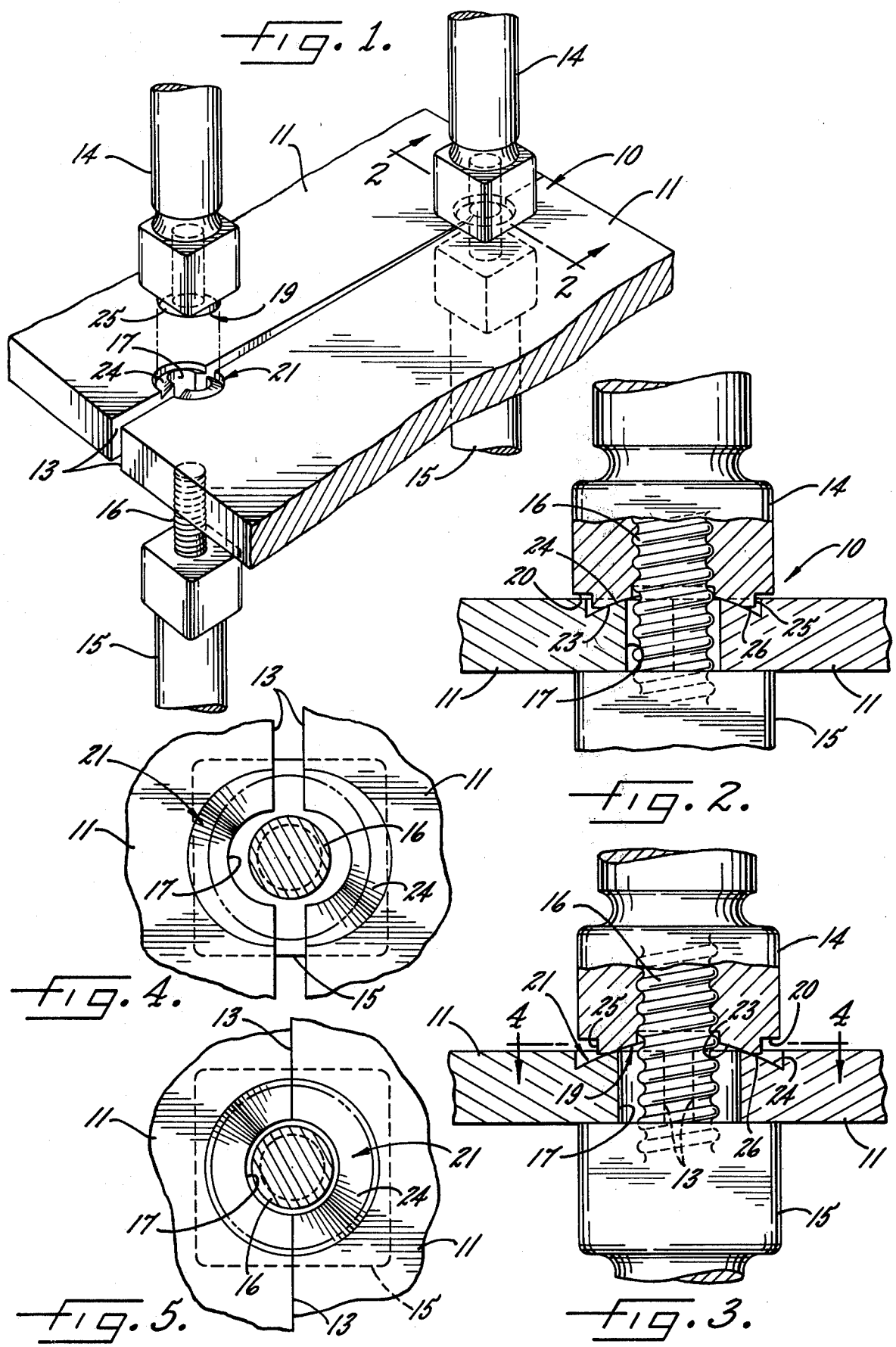

JOINT STRUCTURE FOR MODULAR SHELF ASSEMBLY

BACKGROUND OF THE INVENTION

The present invention relates to a modular shelf system and, more particularly, to a joint structure employed in the system to hold abutting shelves against edgewise separation. In one such system, the joint structure includes abutting, planar shelves sandwiched between vertical supports extending both upwardly and downwardly from the shelves. Connected between the upper and lower supports is a fastening member for drawing the two supports toward each other to clamp against the shelves. In assembling the shelf system, open-sided holes in the edges of the abutting shelves are aligned, facing each other to receive the fastening member. A groove formed in each shelf concentric with the hole receives an annular boss projecting downwardly from the lower end of the upper support to hold the shelves against edgewise separation once the supports are drawn tightly against the shelves by the fastening member.

A joint structure of the foregoing type is disclosed in Kellogg U.S. Pat. No. 3,831,533.

SUMMARY OF THE INVENTION

The primary object of the present invention is to provide a new and improved joint structure of the foregoing general character in which the abutting shelves of the modular shelf system are locked together more securely against edgewise separation and which, during assembly of the shelves, serves to cam the shelves tightly together with the holes in the abutting shelves being precisely aligned with each other. More particularly, the invention resides in the provision of a unique, inverted, cup-shaped boss on the end of the support, the boss being sized to mate with a correspondingly shaped recess which is formed in the shelves to coact with the boss to cam the shelves tightly together and to precisely locate and hold the shelves together more securely against edgewise separation.

These and other objects and advantages of the present invention will become more apparent from the following detailed description when taken in conjunction with the accompanying drawings.

BRIEF DESCRIPTION OF THE DRAWINGS

FIG. 1 is a fragmentary, perspective view of portions of a modular shelf system employing a joint structure embodying the novel features of the present invention.

FIG. 2 is a fragmentary cross-sectional view taken substantially along line 2—2 of FIG. 1.

FIG. 3 is a view similar to FIG. 2 but showing parts of the joint structure in an initial stage of its assembly.

FIG. 4 is a view taken substantially along line 4—4 of FIG. 3.

FIG. 5 is a view similar to FIG. 4 but showing parts of the joint structure in moved positions.

DETAILED DESCRIPTION OF THE PREFERRED EMBODIMENT

As shown in the drawings for purposes of illustration, the present invention is embodied in a joint structure 10 adapted for use in a modular shelf system to hold coplanar shelves 11 together in abutting edge-to-edge engagement. Opposing end edges 13 of the shelves are held in abutting engagement with each other against edgewise separation and are supported vertically within the system by upper and lower rods 14 and 15. The rods extend vertically from the edges of the abutting shelves in opposing axially aligned directions so that the shelves are sandwiched between the rods. To hold the rods together, a threaded fastener 16 extends through a hole 17 formed through the shelves and is connected to the lower end portion of the upper rod and the upper end portion of the lower rod. The fastener serves to draw the rods toward each other thereby clamping the shelves tightly between the rods. Herein, one-half of the hole is formed in the abutting edge margin of each shelf so that, when the edges of the two shelves are properly aligned and placed into abutting engagement with each other, the halves align to produce the cylindrical hole.

Edgewise separation of the shelves 11 is prevented by means of an annular boss 19 which is formed on the lower end 20 of the upper rod 14 to telescope into an annular recess 21 formed in the upper side of the shelves. As shown in FIG. 1, one-half of the recess is formed in each shelf, the recess being concentric with and spaced radially outward from the hole 17. The boss is spaced radially inward from the peripheral edge of the lower end 20 of the support rod 14 (see FIGS. 2 and 3) and projects from the lower end of the rod in a generally axial direction. Accordingly, when the two rods 14 and 15 are tightened against the shelves by means of the fastener 16, the boss telescopes into the recess to hold the shelves against edgewise separation. Preferably, the outer margin of the lower end of the rod extends radially beyond the periphery of the recess so that, once the rods have been assembled with the shelves, the recess is concealed from view.

In accordance with the primary aspect of the present invention, the boss 19 and the recess 21 are shaped in a unique fashion so that, as an incident to tightening the support rods 14 and 15 together, the boss and the recess coact to cam the two shelves 11 together, precisely aligning the two halves of the hole 17 and drawing the shelves tightly and more securely together without leaving a gap between them. For these purposes, the boss is formed with an inverted, cup-shaped, outer end surface 23 and the recess is formed with a bottom surface 24 of a corresponding configuration. Accordingly, as the fastener 16 is turned to tighten the rods against the shelves, the end surface of the boss engages with the bottom surface of the recess, camming the shelves toward each other so the edges of the shelves abut each other and the halves of the hole are centered together, the shelves aligning within a common plane. By virtue of the unique shape of the boss and the recess, a stronger frictional coupling is achieved between the rods and the shelves to hold the shelves more securely against edgewise separation.

In the present instance, the boss 19 is formed integrally with lower end portion of the upper rod 14 and includes an outer side wall 25 extending in an axial direction away from the end surface 20 of the rod a distance greater than the maximum depth of the recess 21. Accordingly, when the rods 14 and 15 are tightened against the shelves 11, the lower end surface of the rod 14 is spaced slightly from the upper surface of the shelves (see FIG. 2) so that the full force of clamping is applied to the shelves between the boss and the upper end surface of the lower rod 15. Preferably, the end surface of the boss is slanted in a direction toward the end surface of the rod upon progressing radially inward from adjacent the side wall 25 and, more particularly, is curved concave upwardly in a generally axial direction relative to the rod 14 to produce the cup-shaped configuration of the boss. In addition, the lower end surface of the boss is provided with an annular flat 26 which extends radially inward from the lower edge of the side wall to reduce the possibility of the boss being damaged during handling.

The bottom surface 24 of the recess 21 is slanted into the shelves upon progressing outwardly in a generally radial direction from the periphery of the hole 17 and in the exemplary form of the present invention the bottom surface is curved convex upwardly relative to the shelves. Moreover, the outside diameter of the recess is larger than the diameter of the boss but smaller than the diameter of the end surface 20. With this construction, the boss may be telescoped into the recess and clamped against the bottom surface without the side wall 25 engaging the peripheral wall of the recess and interfering with a solid engagement between the abutting edges 13 of the two shelves.

In assembling shelves 11 utilizing the exemplary joint structure 10, as the upper and lower rods 14 and 15 are drawn tightly together, the cup-shaped boss 19 draws the shelves together, camming against the bottom surfaces of the two halves of the recess 21 until the recess halves are centered on the boss and the end edges 13 of the shelves abut one another. Advantageously, this makes it easier to assemble shelves simply because they need not be accurately positioned prior to tightening the rods against the shelves. For instance, as shown in FIG. 1, with one set of upper and lower rods partially tightened against two shelves adjacent one side thereof, a second set of rods adjacent the opposite side of the shelves easily serves to draw closed the gap between the shelves when the rods are tightened together.

From the foregoing, it will be appreciated that the present invention brings to the art a new and improved joint structure 10 for a modular shelf system which not only is easier to use but also serves to more securely lock the abutting shelves together. Advantageously, this is achieved by virtue of the unique cup-shaped boss 19 and recess 21 which when clamped together by the fastener 16 serve to draw the shelves 11 into solid abutting edge-to-edge engagement and to hold the shelves securely together against edgewise separation.

I claim:

1. A joint structure for supporting first and second coplanar shelves of a modular shelf system in abutting edge-to-edge engagement with each other, said structure including a lower support having an upper end abutting the underside of said first and second shelves across the abutting edges of said shelves, an upper support abutting the upper side of said first and second shelves and being in axial alignment with said lower support, a hole concentric with the axis of said supports and extending vertically through said shelves, fastening means extending through said hole and between said upper and lower supports for clamping said supports against said shelves, an annular recess concentric with said hole and being formed in said shelves on one side thereof, said recess having a predetermined diameter and a cup-shaped bottom surface curved convexly in a direction progressing outwardly and away from said shelves, and an annular boss formed on the end of the one of said supports which is adjacent said one side of the shelves, said boss having a diameter less than the diameter of said recess, and an inverted, cup-shaped, outer end surface corresponding to the shape of said bottom surface, said boss being telescoped into said recess with said outer end surface abutting said bottom surface so as to hold said shelves against edgewise separation and with the end of said one support being spaced from said one side of the shelves to assure proper seating of said boss within said recess.

2. A joint structure as defined by claim 1 wherein the diameter of the end of said one support is greater than said predetermined diameter of said recess so as to overlap and thereby conceal the peripheral edge of said recess from view.

3. A joint structure for supporting first and second coplanar shelves of a modular shelf system in abutting edge-to-edge engagement with each other, said structure including a lower support having an upper end abutting the underside of said first and second shelves across the abutting edges of said shelves, an upper support abutting the upper side of said first and second shelves and being in axial alignment with said lower support, a hole concentric with the axis of said supports and extending vertically through said shelves, fastening means extending through said hole and between said upper and lower supports for clamping said supports against said shelves, an annular recess concentric with said hole and being formed in said shelves on one side thereof, said recess having a diameter less than the diameter of the lower end portion of said one support, a peripheral wall of predetermined height and a bottom surface slanted generally toward the opposite side of said shelves upon progressing in a generally radial direction outwardly from the periphery of said hole and toward said peripheral wall, and an annular boss connected to the end of the one of said supports which is adjacent said one side of the shelves, said boss having a diameter less than the diameter of the recess, a radial side wall of a height at least as great as said predetermined height of said outer peripheral wall of said recess and an outer end surface slanted generally toward the end of said one support upon progressing inwardly a generally radial direction from said side wall, said boss being telescoped into said recess with said outer end surface abutting said bottom surface so as to hold said shelves against edgewise separation and with the end of said one support being spaced from said one side of the shelves to assure proper seating of said boss within said recess.

4. A joint structure for supporting first and second coplanar shelves of a modular shelf system in abutting edge-to-edge engagement with each other, said structure including a lower support having an upper end abutting the underside of said first and second shelves across the abutting edges of said shelves, an upper support abutting the upper side of said first and second shelves and being in axial alignment with said lower support, a hole concentric with the axis of said supports and extending vertically through said shelves, fastening means extending through said hole and between said upper and lower supports for clamping said supports against said shelves, an annular recess concentric with said hole and being formed in said shelves on the upper side thereof, said recess having a predetermined diameter and a cup-shaped bottom surface curved convexly in a direction progressing outwardly and away from said shelves, and an annular boss integrally formed with the end of said upper support and projecting in a generally axial direction away from the end of said support, said boss having a diameter less than the diameter of said recess and an inverted, cup-shaped, outer end surface corresponding to the shape of said bottom surface, said boss being telescoped into said recess with said outer surface abutting said bottom surface so as to hold said shelves against edgewise separation and with the end of said upper support being spaced from said upper side of the shelves to assure proper seating of said boss within said recess.

* * * * *